United States Patent [19]

Wahlberg, deceased et al.

[11] Patent Number: 4,710,219
[45] Date of Patent: Dec. 1, 1987

[54] PRODUCTION METHOD OF COMBINED PHOSPHORUS FERTILIZER AND SOIL CONDITIONER

[76] Inventors: Arvo Wahlberg, deceased, late of Soukan Rantatie 16C, 02360 Espoo, Finland; by Anna-Maija Wahlberg, heiress

[21] Appl. No.: 853,354

[22] Filed: Apr. 17, 1986

[30] Foreign Application Priority Data

Apr. 17, 1985 [FI] Finland ................... 85 1525

[51] Int. Cl.$^4$ .................. C05F 13/00; C05B 17/00
[52] U.S. Cl. ............................ 71/11; 71/12; 71/23; 71/24; 71/31; 71/32; 71/33; 71/903
[58] Field of Search ............... 71/11, 12, 23, 24, 903, 71/31-33

[56] References Cited

U.S. PATENT DOCUMENTS 3,239,329  3/1966  Burgon ...................... 71/23
4,571,254  2/1986  Wahlberg ................. 71/23 X

*Primary Examiner*—Ferris H. Lander
*Attorney, Agent, or Firm*—Karl F. Ross; Herbert Dubno; Jonathan Myers

[57] ABSTRACT

A method for producing combined phosphorus fertilizer and soil conditioner in which phosphate rock and, as reaction matter, organic acidic matter are used. In a method according to the invention, the acidic mass is organic, for instance, bark waste, peat, peat mud or waste fibre from a cellulose production plant or the solid component of communal sewage.

13 Claims, 1 Drawing Figure

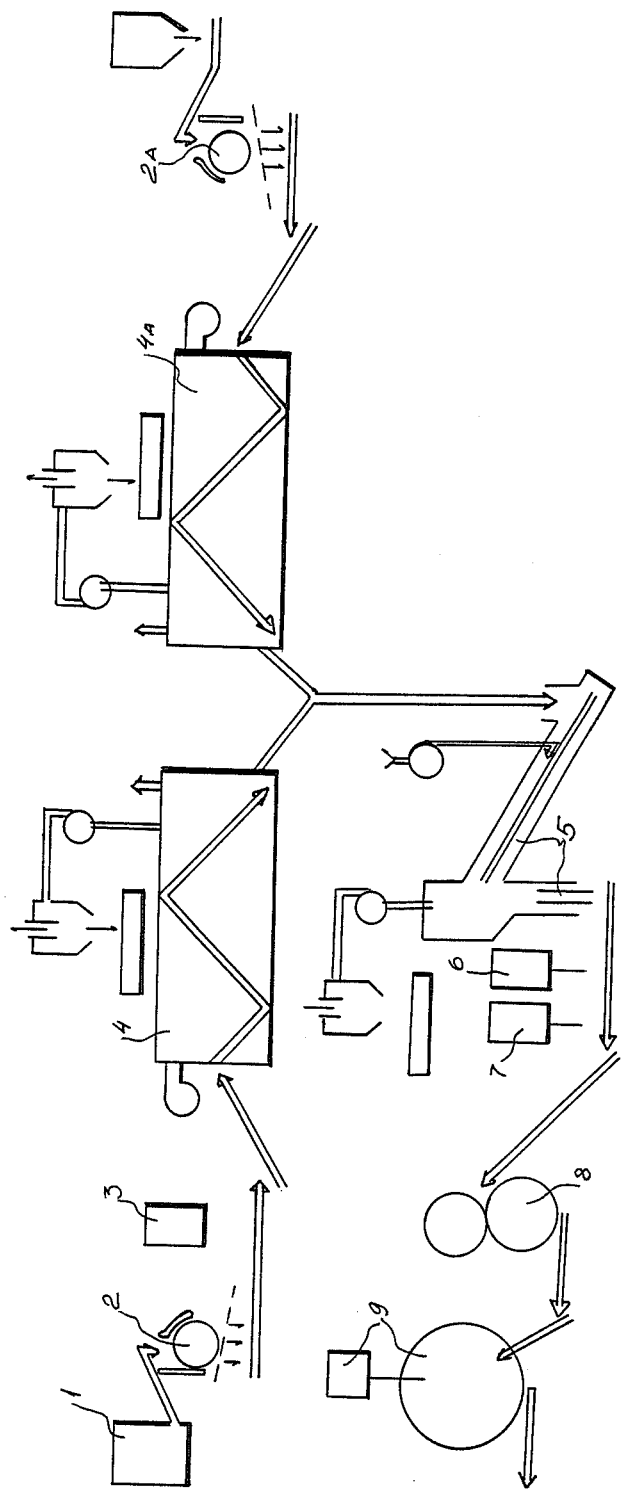

PRODUCTION METHOD OF COMBINED PHOSPHORUS FERTILIZER AND SOIL CONDITIONER

The phosphorus in phosphate rock, apatite and phosphorite, is insoluble or only slightly soluble in water and thus available for plants in limited quantities. In producing phosphorus fertilizers, the objective is to increase the solubility. The most common production method of phosphorus fertilizers is to treat phosphate rock with an inorganic acid, producing a compound suitable for fertilizing purposes as such, or for further processing.

Another method for producing phosphorus fertilizers is the heat treatment of a mixture of phosphate rock and some other substances at a high temperature.

Phosphorus fertilizers are also obtained from iron ores containing phosphorus, as a by-product in the steel industry. The phosphorus fertilizers are produced by a reaction of phosphate rock with an inorganic acid, according to the methods known today:

When sulphuric acid is used for the reaction with phosphate rock, the reaction product is a mixture of monocalcium phosphate and calcium sulphate (gypsum), called superphosphate.

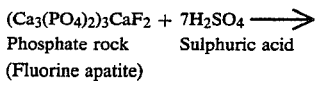
Phosphate rock      Sulphuric acid
(Fluorine apatite)

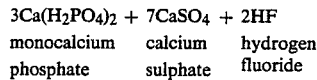
monocalcium   calcium    hydrogen
phosphate     sulphate   fluoride

The superphosphate contains approximately 8% phosphorus, of which at least 93% is soluble in water.

When the tricalcium phosphate in phosphate rock is allowed to react with sulphuric acid and water, the reaction products are phosphoric acid and calcium sulphate:

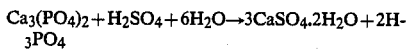

Phosphoric acid is used in a further reaction to produce phosphorus fertilizers, such as triple superphosphate and ammonium phosphates.

In a reaction of phosphate rock with phosphoric acid, triple superphosphate, an almost pure monocalcium phosphate compound, is produced:

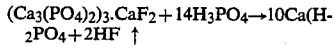

The phosphorus content of the triple superphosphate is approximately 22%, of which at least 93% is soluble in water. The reaction product of phosphate rock and hydrochloric acid is dicalcium phosphate ($CaHPO_4$), which has little value as a fertilizer. The reaction of phosphate rock with nitric acid produces a mixture of monocalcium phosphate and calcium nitrate. After calcium nitrate has been removed, the mixture contains monocalcium and dicalcium phosphates. The N:P ratio in the fertilizer is generally in the range of 1:0.44 ... 1:1.3, and its content of soluble phosphorus is 0 ... 80%, depending on the production method.

Phosphorus fertilizers manufactured by heat processes include Rhenania phosphate, produced by heating a mixture of phosphate rock, sodium carbonate and arenaceous quartz at a temperature of 1200° C.

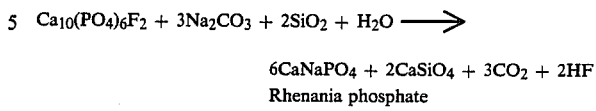
Rhenania phosphate

Rhenania phosphate has a phosphorus content of 11% and is soluble in basic ammonium citrate.

Iron ore containing phosphorus yields Thomas slag as a by-product in the steel industry. Limestone and oxygen are added to the molten iron ore, thus separating the slag on the surface of the mixture.

Thomas slag contains approximately 7 ... 10% phosphorus, of which 90% is soluble in a 2% solution of citric acid.

The process of treating phosphate rock with sulphuric acid is very complex and requires a high pressure, great accuracy and a great deal of energy. Another reaction product is toxic hydrogen fluoride. Sulphuric acid is not only toxic but also expensive, due to the complexity of its production process and the high input of energy required. Although superphosphate contains calcium sulphate, an excessive amount of calcium sulphate waste is also produced in the process, thus causing an environmental hazard.

When treating phosphate rock with sulphuric acid and water in order to produce phosphoric acid, the hazards are the same as mentioned above, with the exception that even more calcium sulphate waste is produced. In addition, the valuable micro nutrients and lanthanides are lost in the process. Phosphoric acid can be regarded as a mere intermediate product, because its use as a fertilizer is very inconvenient. Consequently, it is further processed into other fertilizers, such as triple superphosphate, as described above, or fertilizing compounds.

The reactions of phosphate rock with hydrochloric or nitric acid are utilized very infrequently.

During heat treatment of phosphate rock, the substances contained in the rock are retained in the fertilizer. However, the required temperature of 1200° C. is extremely high, involving very high energy consumption. In addition, the phosphorus in the end product is not water-soluble.

Thomas slag is one of the oldest phosphorus fertilizers. It is, however, produced only by the steel industry, and only if the iron ore contains phosphorus. Another disadvantage of the process is that it causes considerable noxious odours. The invention eliminates or considerably reduces the previously mentioned hazards as follows:

Consumption of energy remains remarkably low
No industrially produced inorganic acids are needed
There are no environmental hazards in the process, such as toxic reaction products, odour or waste products.
The nutrient elements of phosphate rock are almost completely retained in the fertilizer.

The characteristics of the invention are presented in the patent claim. Below, an application of the method is described in detail, with reference to the adjoining drawing.

The organic material, consisting of bark waste or peat, is fed from a feed silo, pos. 1, to the grinding unit, pos. 2. If peat mud, waste fibre from a cellulose production plant, saw dust or the solid component of communal sewage are used in addition to or instead of the materials mentioned above, the organic material can be fed to the process directly from the tank, pos. 3. All the materials mentioned must be acidic, with a pH of less than 5. The reaction mass of bark, peat, cellulose waste material or sawdust is heated in the reactor furnace, pos. 4, to a temperature of 40 ... 120° C., depending on the water content of the mass; the greater the water content, the higher the temperature. The reaction pressure will rise to approximately 16 ... 22 bar at this stage. The solid component of communal sewage must not be heated to a temperature above 70° C., which also implies a somewhat lower pressure. This process corresponds to the process described in the claim no. FI841230, "A method for producing fertilizers from wood ashes and softwood bark or from other wood waste material", with the exception that the water content of the fresh organic material should be 40% at the minimum. This requirement is not included in the production method described in claim no. FI841230. After the reactor furnace, pos. 4, phosphate rock, such as apatite and/or phosphorite, is fed into the process. The rock is to be preprocessed in the following way: first, the rock is ground in a grinder, pos. 2A, to a particle size of 0.02 ... 1 mm. The smaller the particle size, the higher the phosphorus content of the fertilizer. The optimum size is 0.02 ... 1 mm. After grinding, the rock is transferred to a heating furnace, pos. 4A, in which the surface temperature is approximately 800° C. The particles are rapidly heated to a temperature of 50 ... 800° C., with an optimum temperature of 400 ... 500° C. The optimum temperature depends on the quality of the phosphate rock and on its water content. The closer to the optimal temperature the reaction takes place, the higher the content of soluble phosphorus in the end product.

After this stage, the mass of phosphate rock and organic reaction mass from the reactor furnace, pos. 4, are allowed to collide and mix. The pressure formed at the colliding and mixing stage is 20 ... 55 bar. Generally, the higher the pressure under which the phosphate rock was formed, the higher the temperatures must be, thus also leading to higher pressures at the mixing stage. This results in partial or complete disintegration of the phosphate rock, due to the following factors:

1. Because the pH of the organic reaction mass is lower than that of the rock, the acidity of the mixture will tend towards a state of equilibrium. The lower the pH of the organic matter is, the stronger the chemical reaction between the organic matter and the phosphate rock will be, and the higher the content of water-soluble phosphorus in the fertilizer will also be.
2. Because the calcium and phosphorus contents are lower in the organic matter than in the phosphate rock, the lower the calcium and phosphorus content of the organic mass is, the stronger the chemical reaction between them is, and also the higher the content of water-soluble phosphorus in the fertilizer.

The weight ratio of dry phosphate rock to fresh organic matter is 0.15 ... 0.5. The the amount of organic matter, the greater amount of the phosphorus in the rock is converted into water-soluble form. The time required for the reaction is 10 ... 60 minutes, generally approximately 15 minutes. The longer the reaction time, the greater the amount of phosphorus in the rock brought into water-soluble form.

In addition to the organic waste materials mentioned above-bark waste, peat, peat mud, waste fibre from cellulose production plant, sawdust, the dry component of communal wastes —other equivalent organic matters can also be used as reagents.

After the reaction, the mass, the temperature of which is 90° C., is cooled quickly in a cooler, pos. 5, to a temperature of 20 ... 40° C.

Finally, wood or bark ashes can be added, if necessary, from the tank, pos. 6, or nitrogen from tank, pos. 7, and the mass is granulated on the rollers, pos. 8, if desired, and ashes can be applied to the surface of the granules in the mixing tank, pos. 9, as in the process described in claim no. FI841230 mentioned above.

The process described in the invention thus imitates the disintegration process of phosphate rock taking place in nature. The content of water-soluble phosphorus in the fertilizer is 0 ... 90%, depending on the amount and characteristics of the organic matter and the reaction time. The reaction product is monocalcium phosphate ($Ca(H_2PO_4)_2$), a phosphorus compound soluble in water. The energy consumption remains low, because the reaction occurs at a low temperature and because the organic reaction matter is not produced industrially. There are no environmental hazards; on the contrary, the process consumes organic matter that is hazardous to the environment. The nutrient fractions contained in the phosphate rock are retained more completely than in processes involving the use of inorganic acids, as completely as in heat treatment methods.

The combined phosphorus fertilizer and soil conditioner can also be used as covering material, if desired. In this case, the solubility of the phosphorus is of no practical consequence. Thus the content of water-soluble phosphorus can be low and the production process can be somewhat simplified: the reaction time can be short, and the temperature to which the phosphorus ore is heated, can be low.

What I claim is:

1. A method for producing a combined phosphate fertilizer and soil conditioner without employing a mineral acid, which consists essentially of the steps of:
   (a) grinding a moist, acidic, organic waste material having a pH less than 5, a water content of at least 40% and lower calcium and phosphorous contents than the calcium and phosphorous contents of phosphate rock;
   (b) heating the acidic, organic waste material ground during step (a) to a temperature of 40° to 120° C. and at a pressure of 16 to 22 bar;
   (c) grinding phosphate rock to a particle size of 0.02 to 1 mm;
   (d) heating the phosphate rock ground during step (c) to a temperature of 50 to 800° C.;
   (e) combining the ground, acidic, organic waste material obtained during step (b) as the sole acidic reactant with the ground phosphate rock obtained during step (d) at a pressure of 20 to 55 bar to permit the ground, acidic, organic waste material and the ground phosphate rock to collide, to cause disintegration of the phosphate rock; and
   (f) cooling the mixture obtained during step (e) to 20° to 40° C. to obtain the desired product which contains almost all nutrient elements of phosphate rock.

2. A method for producing combined phophorus fertilizer and soil conditioner according to claim 1, in which the organic reactant is bark waste.

3. A method for producing combined phophorus fertilizer and soil conditioner according to claim 1, in which the organic reactant is peat or peat mud.

4. A method for producing combined phosphorus fertilizer and soil conditioner according to claim 1, in which the organic reactant is waste fibre from a cellulose production plant.

5. A method for producing combined phosohorus fertilizer and soil conditioner according to claim 1, in which the organic reactant is sawdust.

6. A method for producing combined phosphorus fertilizer and soil conditioner according to claim 1, in which the organic reactant is the solid component of communal sewage.

7. A method for producing combined phosphorus fertilizer and soil conditioner according to claim 1, in which the amount of water-soluble phosphorus in the fertilizer is regulated by the pH of the reagent mass.

8. A method for producing combined phosphorous fertilizer and soil conditioner according to claim 1, in which the amount of water-soluble phosphorus in the fertilizer is regulated by calcium and phosphorus content of the reagent mass.

9. A method for producing combined phosphorus fertilizer and soil conditioner according to claim 1 which the amount of water-soluble phosphorus in the fertilizer is regulated by the reaction temperature.

10. A method for producing combined phosphorus fertilizer and soil conditioner according to claim 1, in which the amount of water-soluble phosphorus in the fertilizer is regulated by the duration of the reaction.

11. A method for producing combined phosphorus fertilizer and soil conditioner according to claim 1, in which the amount of water-soluble phosphorus in the fertilizer is regulated by the weight ratio of the fresh organic mass and the dry phosphate rock.

12. A method for producing combined phosphorus fertilizer and soil conditioner according to claim 1, in which the amount of water-soluble phosphorus in the fertilizer is regulated by the particle sixe if the crushed phosphate rock.

13. A method for producing combined phosphorus fertilizer and soil conditioner according to claim 1, in which the water-solubility of the phosphorus is allowed to remain low and thus the product is suitable for covering material.

* * * * *